Feb. 1, 1944.　　L. A. PARADISE ET AL　　2,340,488
MOWER
Filed June 12, 1942　　4 Sheets-Sheet 2

INVENTORS
LOUIS A. PARADISE
WILBUR J. COULTAS
BY
ATTORNEYS

Feb. 1, 1944. L. A. PARADISE ET AL 2,340,488
MOWER
Filed June 12, 1942 4 Sheets-Sheet 3
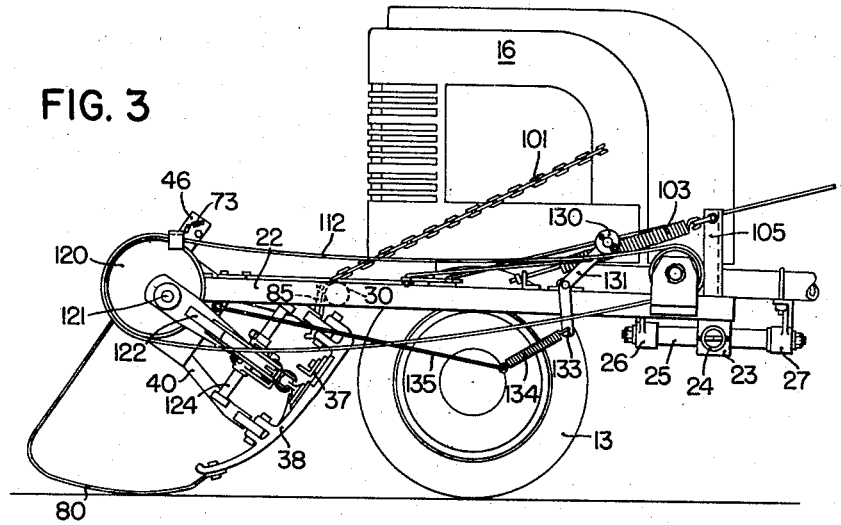
FIG. 3
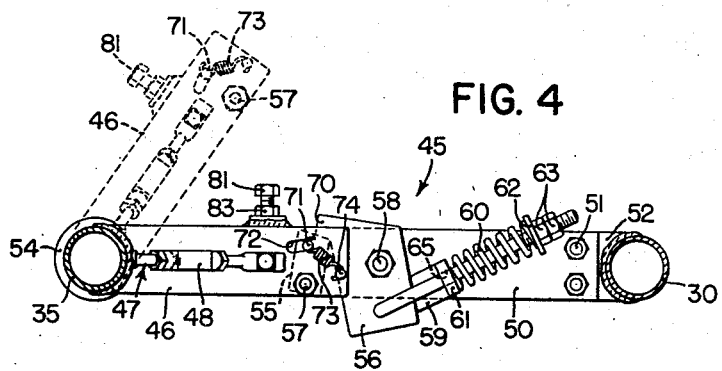
FIG. 4
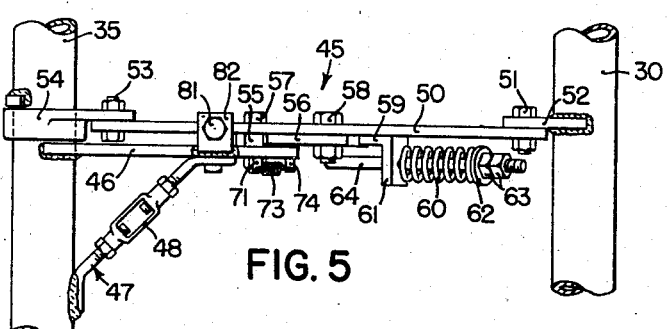
FIG. 5
INVENTORS
LOUIS A. PARADISE
WILBUR J. COULTAS
BY
ATTORNEYS Feb. 1, 1944.　　　L. A. PARADISE ET AL　　　2,340,488
MOWER
Filed June 12, 1942　　　4 Sheets-Sheet 4
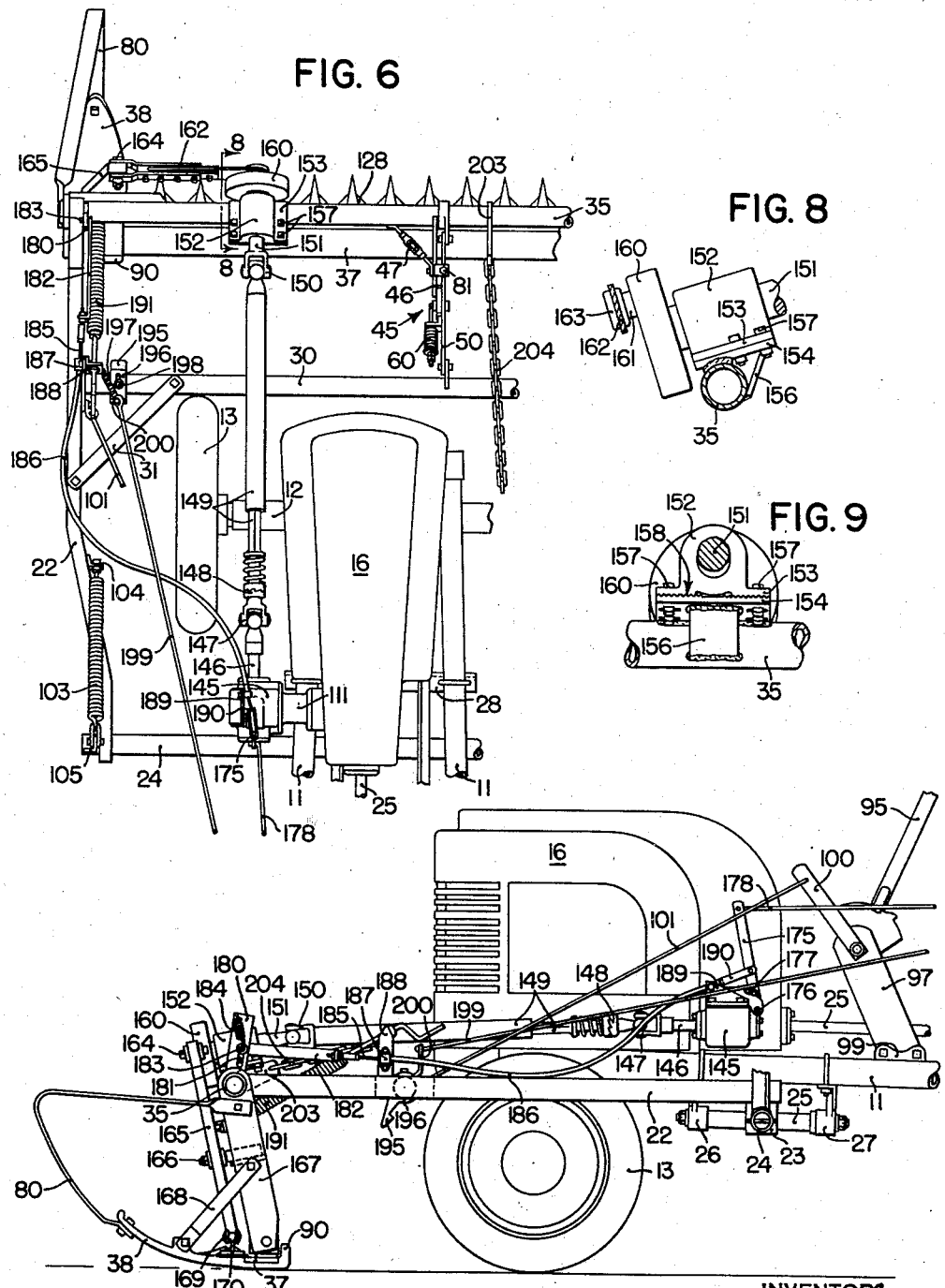
FIG. 6
FIG. 8
FIG. 9
FIG. 7
INVENTORS
LOUIS A. PARADISE
WILBUR J. COULTAS
BY
ATTORNEYS Patented Feb. 1, 1944

2,340,488

UNITED STATES PATENT OFFICE 2,340,488

MOWER

Louis A. Paradise and Wilbur J. Coultas, Moline, Ill., assignors to Deere & Company, Moline, Ill., a corporation of Illinois Application June 12, 1942, Serial No. 446,734

28 Claims. (Cl. 56—25)

The present invention relates generally to mowers and more particularly to tractor-mounted mowers, and is particularly well adapted for cutting vegetation along the shoulders of highways and roads. Heretofore, highway mowers have usually taken the form of tractors having cutter bars mounted thereon and extending laterally from one side of the tractor, such as, for example, the mower disclosed in a co-pending application, Serial No. 257,804, filed February 23, 1939, now Patent No. 2,292,362, granted August 11, 1942, by W. J. Coultas. In this type of mower, the tractor runs on the highway, while the cutter bar extends outwardly over the highway shoulder, and the grass and other vegetation are cut as the tractor moves along the pavement. There is an advantage, however, in not having the tractor operate on the pavement in the path of high-speed traffic, and therefore one of the principal objects of the present invention relates to the provision of a mower which is supported on the tractor in such a position that the latter does not travel on the pavement during operation. According to the present invention, this object is accomplished by positioning the cutter bar either directly in front or directly in rear of the tractor.

Heretofore, with the side mounted mower, it is frequently necessary to make two trips along the same shoulder of a highway in order to mow first the horizontal portion of the shoulder, and, on the second trip, to mow the inclined bank along the shoulder. According to the present invention, it is possible to mount a conventional side mounted mower on the same tractor with a mower mouned transversely at one end of the tractor and in the path of travel thereof, and thus mow the horizontal and inclined portions of the shoulder simultaneously.

It is desirable to provide a yieldable mount for the cutter bar of a mower, so that when the latter encounters an obstruction during operation, the cutter bar can move rearwardly and thus avoid damage to the cutter bar and supporting frame, as well as lessen the shock to the tractor and operator. The conventional manner of mounting a cutter bar provides for a vertical pivot between the cutter bar support and the tractor so that the cutter bar can swing horizontally about a vertical axis, but is normally retained by a latch mechanism in a transversely extending operating position. When the cutter bar encounters a stone or stump or other obstruction, the excessive draft force against the latch, occasioned by the continued forward movement of the tractor, causes the latch to yield and allow the cutter bar to swing rearwardly. A further object of our invention, therefore, relates to the provision of a novel arrangement of a cutter bar at the forward end of the tractor in the path of movement of the latter, which can yield and swing rearwardly to avoid an obstruction in the field during operation.

Heretofore, rearwardly yieldable side mounted mowers were either pivoted to the tractor on an axis closely adjacent the inner end of the cutter bar, with the disadvantage that when the inner end of the cutter bar encountered an obstruction a much greater jar or shock was required to cause the latch to yield than when the outer end of the cutter bar encountered an obstruction, due to the much greater mechanical advantage at the outer end of the cutter bar. This arrangement was greatly improved upon by pivotally mounting the cutter bar supporting member on the tractor at the opposite side to that of the cutter bar, and then providing for the tractor to roll over the cutter bar support to permit the cutter bar to swing to a rearwardly trailing position behind the tractor. Such an arrangement was disclosed in the above-identified co-pending Coultas application. With this arrangement, the inner end of the cutter bar is nearly half as far from the pivot axis as the outer end of the cutter bar, and therefore requires only about twice as much force against the inner end of the cutter bar to release the latch as against the outer end. Another object of the present invention, however, relates to the provision of a mower having a rearwardly yieldable cutter bar, which requires exactly as much force at one end of the cutter bar as at the other, in order to release the yieldable latch and allow the cutter bar to swing rearwardly. This is accomplished by mounting the cutter bar for rearward swinging movement about a transversely disposed axis disposed at an appreciable distance above the cutter bar.

These and other objects and advantages of the present invention will be apparent to those skilled in the art after a consideration of the following description, in which reference is had to the drawings appended hereto, in which Figure 1 is a plan view of a mowing machine embodying the principles of the present invention;

Figure 3 is a side elevational view of the forward part of the tractor and mower, showing the latter in a position with the cutter bar swung rearwardly and upwardly out of normal operating position;

Figure 4 is a side elevational view of the latch detail, taken along the line 4—4 in Figure 1, drawn to an enlarged scale, showing in solid lines the normal latched position, and in dotted lines the position of one of the latch members when the cutter bar has swung to inoperative position;

Figure 5 is a plan view of the latch mechanism shown in Figure 4;

Figure 6 is a fragmentary plan view showing a modified form of our invention;

Figure 7 is a side elevational view of the forward portion of the tractor and mower according to the modification of Figure 6;

Figure 8 is a side elevational view taken along a line 8—8 in Figure 6 and drawn to an enlarged scale, showing the method of mounting the power shaft bearing and flywheel on the rockshaft in the embodiment of Figures 6 and 7; and Figure 9 is a rear elevational view of the bearing mounting shown in Figure 8.

Figure 1:
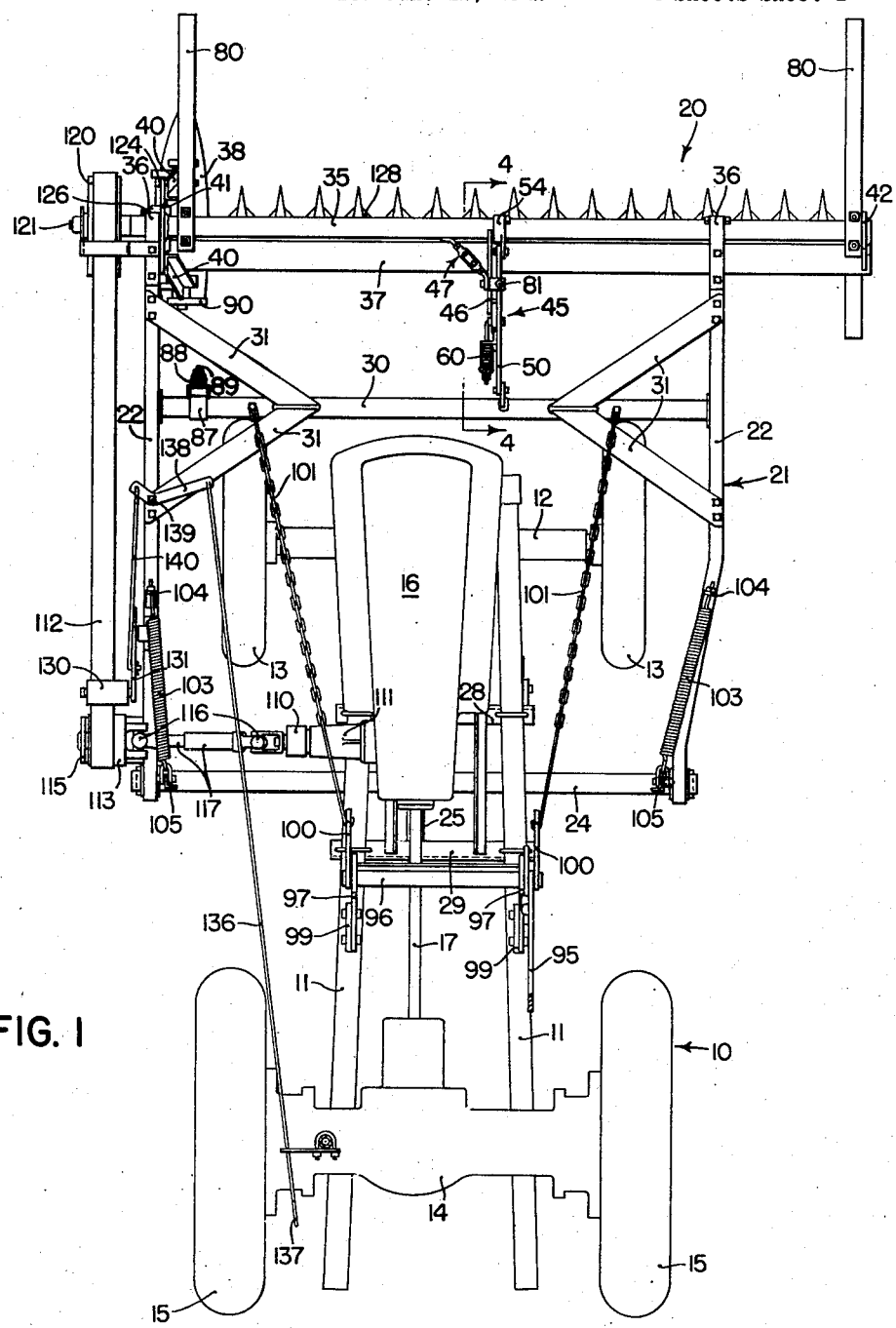
Figure 2:
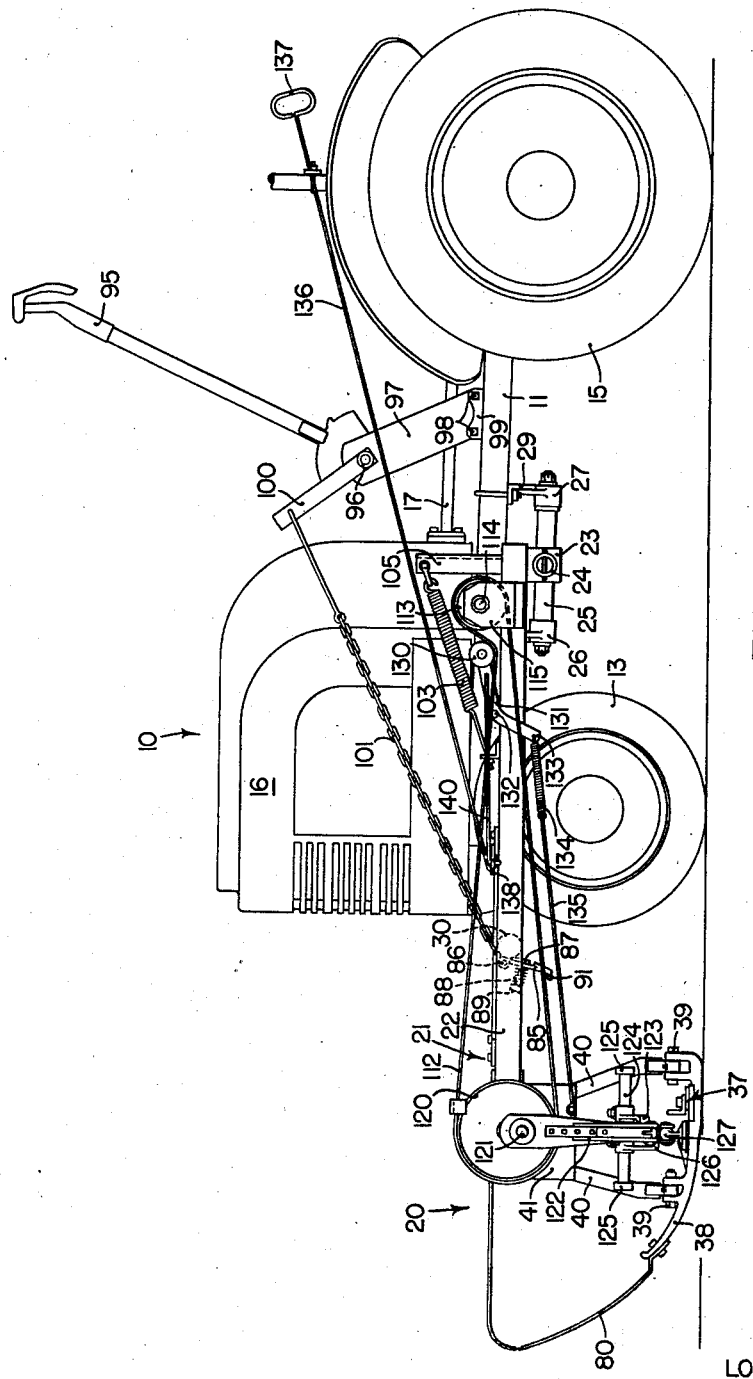
Figure 2 is a side elevational view of the mowing machine showing the cutter bar in normal operating position.

Referring now to the drawings and more particularly to Figures 1, 2 and 3, the tractor, indicated in its entirety by reference numeral 10, can be of any type known to those skilled in the art and as illustrated comprises a pair of longitudinally extending frame members 11 mounted at their forward ends on a transverse front axle member 12, which is supported at opposite ends, respectively, on a pair of ground wheels 13. The frame members 11 are fixed adjacent their rear ends to a transverse differential housing 14, carried at opposite ends, respectively, on a pair of traction wheels 15. An engine housing 16 is carried at the forward end of the frame, in which is housed the usual tractor power plant, which drives through a rearwardly extending transmission shaft 17 to the transmission gears and rear axle drive mechanism within the housing 14.

The mower 20 comprises a supporting frame 21 including a pair of laterally spaced longitudinally extending frame beams 22, disposed along opposite sides of the tractor, respectively, and swingably attached by depending brackets 23 to a transverse pipe member 24 disposed beneath the tractor body between the front and rear wheels 13, 15 thereof, which is rigidly fixed to a fore and aft extending shaft 25, journaled in a pair of spaced front and rear bearing brackets 26, 27, respectively, the latter being rigidly mounted on cross frame members 28, 29 on the tractor frame 11. Thus, the frame 21 is swingable vertically about the transverse axis of the pipe member 24, on which the brackets 23 are journaled, and the frame 21 is also tiltable about the fore and aft extending axis of the shaft 25, thus providing for free floating movement of the mower frame relative to the tractor.

The longitudinal beams 22 are interconnected, intermediate their front and rear ends, by a transverse frame member in the form of a pipe 30, which is suitably braced adjacent opposite ends, by diagonal bracing members 31. A tubular rockshaft 35 is journaled in bearings 36 at the forward ends of the two frame beams 22. Directly beneath the rockshaft 35 is disposed a more or less conventional mower cutter bar 37, which extends transversely across the front of the tractor and in the path of forward movement thereof. The conventional mower shoe 38 is secured by a pair of bolts 39 to a pair of supporting legs 40, which extend upwardly and are rigidly fixed to a plate 41, which is welded to the bearing bracket 36 on the forward end of the left hand longitudinal beam 22. The opposite end of the rockshaft 35 extends beyond the opposite beam 22 and supports the outer end of the cutter bar 37 by means of a depending leg 42, which is fixed to the end of the rockshaft 35 and to the outer end of the cutter bar. Thus, the cutter bar 37, supporting legs 42, and the rockshaft 35 can all be rocked as a unitary structure about the transverse horizontal axis of the rockshaft 35.

Normally, the cutter bar 37 is in its operating position shown in Figures 1 and 2, and is releasably secured in this operating position by means of latch mechanism, indicated generally by reference numeral 45, best shown in Figures 4 and 5 and disposed approximately at the midpoint of the rockshaft 35. This mechanism includes an arm 46, rigidly welded to the rockshaft 35 and extending rearwardly therefrom and braced by means of a diagonal bracing member 47, which includes a turnbuckle 48 for the purpose of determining the exact angular position of the arm 46 with respect to the rockshaft 35. An interconnecting frame member 50 is disposed adjacent the arm 46, and is rigidly fixed to the transverse frame member 30 by bolts 51 which engage a lug 52, welded to the frame member 30. The forward end of the interconnecting member 50 is bolted at 53 to a bracket 54 journaled on the rockshaft 35. The arm 46 is normally secured to the interconnecting frame member 50 by means of a pair of latch members 55, 56, pivotally mounted on the arm 46 and frame member 50 by means of pivot bolts 57, 58, respectively. The latch member 56 is urged against a stop member 59 rigidly fixed, as by welding, to the side of the interconnecting frame member 50, by means of a compression spring 60, which bears against an outwardly turned ear 61 on the stop member 59 and acts against a washer 62, held by nuts 63 on a rod 64, which extends axially through the compression spring 60 and through a suitable opening 65 in the ear 61. The end of the rod 64 is hooked into a suitable aperture in the latch member 56 beneath the pivot bolt 58.

Thus, the spring 60 holds the latch 56 against the stop 59, but is yieldable to permit the latch 56 to be rotated in a clockwise direction as viewed in Figure 4. The latch member 56 is provided with an inclined nose portion 70, which engages the other latch member 55 at such an angle that latch member 55 is urged in a clockwise direction by the resistance of the vegetation to forward movement of the cutter bar, which tends to swing the arm 46 upwardly. The latch member 55 is provided with a stop pin 71, fixed to the latch membebr 55 and extending through an arcuate slot 72 in the arm 46. A coil spring 73 is connected between the stop pin 71 and a bolt 74 in the end of the arm 46, and tends to hold the latch member 55 in contact with the latch member 56, with the stop pin 71 against the rear end of the slot 72.

When the cutter bar 37 encounters an obstruction during operation, the forward movement of the tractor causes an excessive force to be exerted against the rockshaft 35, tending to swing the arm 46 upwardly, whereupon the pressure of the latch member 55 against the nose 70 of latch member 56, forces the latter to pivot about the bolt 58 against the force of the spring 60 until the latch members 55, 56 are released, allowing the arm 46 to swing upwardly as the cutter bar 37 swings rearwardly and upwardly about the axis of the rockshaft.

A pair of curved runners 80 are fixed at opposite ends of the cutter bar 37 and engage the ground when the cutter bar swings rearwardly. The forward movement of the tractor tends to roll the runners along the ground to lift the cutter bar over the obstruction, if possible, and to act as supporting runners for the cutter bar and for the floating mower frame 21. By backing the tractor, the cutter bar is returned to normal operating position, and as the arm 46 approaches its horizontal position, the latch member 55 engages the nose 70 of the other latch member 56, thereby causing the latch member 55 to swing about the pivot bolt 57 against the tension of the spring 73, until the latter returns the latch 55 to its engaged position beneath the nose 70 as shown in Figure 4.

A set screw 81 is carried in a suitable threaded aperture in an ear 82, rigidly welded to the arm 46 and overlying the longitudinal bracing member 50. The set screw 81 serves as a stop to prevent the cutter bar from swinging too far forwardly, and engages the top of the arm 50, to stop the arm 46 from swinging below horizontal position. The set screw 81 is adjustable vertically, and is secured in adjusted position by a lock nut 83.

When the cutter bar swings rearwardly, it is engaged and retained in raised position by means of a latch member 85, which is pivotally connected at 86 to an arm 87, which is fixed to the transverse frame member 30. A spring 88 bears against the latch 85 and reacts against a nut 89 on a bolt fixed to the arm 87, and thus holds the latch 85 in engagement with a projection 90 on the heel of the mower shoe 38. The latch 85 can be disengaged by hand, or by means of a suitable control rope (not shown), attached to a projection 91 on the lower end of the latch.

The entire mower frame 21 can be swung vertically about the axis of the transverse pivot support 24, by means of a hand lever 95, which is fixed to a transverse rockshaft 96, the latter being journaled at opposite ends thereof, respectively, in a pair of laterally spaced supporting plates 97. Each of the supporting plates 97 is rigidly fixed by bolts 98 to a lug 99 welded on the top of each of the frame members 11. The rockshaft 96 is provided with a pair of rigid lifting arms 100, which are connected by means of chains 101 to the transverse pipe frame member 30, at opposite ends of the latter, respectively. Normally, it is preferable to allow the frame 21 to float vertically as the cutter bar rides along the surface of the ground, but when it is desired to transport the mower, the lever 95 can be pulled rearwardly to raise the entire frame 21 and thus raise the cutter bar off the ground to permit transport at relatively high speeds. During transport, it is desirable to swing the cutter bar rearwardly and retain it in raised position by the latch 85. The weight of the frame 21 is counterbalanced by means of a pair of springs 103, which are connected to a pair of lugs 104 on the two push beams 22 and extend rearwardly to a vertical standard 105 fixed to each end of the transverse beam 24.

The tractor 10 is provided with a power take-off shaft 110 extending laterally from the tractor engine and carried in a sleeve bearing 111. Power is transmitted from the power take-off shaft 110 for driving the cutting apparatus, by means of a flexible belt 112, trained over a drive pulley 113, which is journaled on a stub axle 114, fixed to a bracket plate 115, which is rigidly attached to the adjacent push bar 22. The pulley 113 is connected with the power take-off shaft 110 by means of a pair of universal joints 116 interconnected by a telescoping shaft 117. The telescoping shaft and universal joints provide for lateral tilting and for vertical swinging movement of the mower frame 21 relative to the tractor. The forward end of the belt 112 is trained over a pulley 120, which is rotatably supported at the end of the rockshaft 35. The pulley 120 is provided with an eccentric crank 121, which is connected through a pitman 122 to an arm 123 fixed to a rockshaft 124, the latter being journaled in a pair of bearings 125, fixed to the supporting legs 40, respectively. Another arm 126 on the rockshaft 124 is connected by the usual ball and socket joint 127 to the knife head of the sickle 128 which reciprocates with respect to the cutter bar 37 to sever the vegetation.

The belt 112 is normally loosely trained over the pulleys 113, 120, and is inoperative to transmit power when it is loose, but is tightened by means of a belt tightener including an idler pulley 130, journaled at one end of the bell crank 131, which is pivotally mounted on a pin 132 on the push bar 22, for vertical swinging movement to shift the idler pulley 130 into and out of engagement with the top side of the belt 112. A lower arm 133 of the bell crank 131 is connected through a spring 134 and rod 135 to the vertical plate 41 beneath the rockshaft 35. When the cutter bar is in normal operating position, the spring 134 is under tension and thus holds the idler pulley 130 against the belt, but when the mower cutter bar swings rearwardly and upwardly, this relieves the tension on the spring 134 and allows the belt 112 to loosen, and so to interrupt the drive to the sickle. The tractor operator, however, has control of the belt tightener through a control rod 136 having a handle 137 adjacent the operator, and extending forwardly to a bell crank 138, pivoted at 139 to the push bar 22 ahead of the belt tightener, the opposite arm of the bell crank 138 being connected by a rod 140 to the bell crank 131 on which the idler 130 is mounted. Thus, by pulling rearwardly on the handle 137, the bell crank 131 is swung in a counterclockwise direction as viewed in Figure 2, against the tension of the spring 134, thus raising the idler 130 away from the belt and interrupting the flow of power to the sickle.

Referring now more particularly to Figures 6-9, inclusive, the modified form of the present invention is similar in most respects to the embodiment disclosed in Figures 1-5, but instead of the belt drive described above, this embodiment employs a more direct drive to the sickle, including a gear housing 145, mounted at the side of the tractor on the power take-off bearing housing 111. Within the housing 145 is a pair of intermeshing bevel gears (not shown), driving a power shaft 146 which extends forwardly out of the housing 145, and is connected through a universal joint 147 and an overload release clutch 148 to an extensible power shaft comprising a pair of telescoping members 149, which extends forwardly of the tractor and is connected at its forward end through a universal joint 150 to a flywheel shaft 151 supported in a bearing housing 152. The housing 152 is provided with a base plate 153, which is carried on a supporting plate 154, the latter being welded to the rockshaft 35 and rigidly braced by means of a diagonal bracing plate 156 which is also welded to the rockshaft 35. A plurality of bolts 157 secures the two plates 153, 154 together, and extend through aligned openings in the plates, but the openings are enlarged to permit the housing supporting plate 153 to be shifted laterally with respect to the supporting plate 154. The contacting surfaces of the plates 153, 154 are provided with intermeshing serrations, indicated at 158 (Figure 9), the serrations extending generally fore and aft to prevent the bearing housing 152 from shifting laterally after it has been secured by the bolt 157 in laterally adjusted position. The purpose of this adjustment, as will be seen shortly, is for adjusting the register of the sickle with respect to the cutter bar.

The shaft 151 extends forwardly from the bearing housing 152 and supports a flywheel 160, which is rigidly fixed thereto. The flywheel 160 is provided with an eccentric crank arm 161 fixed to the forward face thereof, and a generally horizontally disposed pitman 162 is provided with a bearing 163 which is journaled on the crank 161. The opposite end of the pitman 162 is pivotally connected by a bolt 164 to the upper end of a long lever arm 165. The lever arm 165 is disposed generally vertically in front of the rockshaft 35 and is pivotally supported intermediate its ends, on a fore and aft extending pivot pin 166, which is fixedly mounted on the vertical supporting leg 167 which supports the end of the cutter bar 37 from the rockshaft 35. The leg 167 is braced to the forward end of the shoe 38 by an inclined bracing member 168. The lower end of the lever arm 165 is flexibly connected through a suitable ball and socket linkage 169 to the knife head 170 of the sickle 128. It is now evident that when the bearing housing 152 is shifted laterally on its supporting plate, the register of the sickle with respect to the cutter bar can be adjusted. It is also evident that this type of power connection, while providing a more positive drive to the sickle, is sufficiently flexible to permit the cutter bar to swing upwardly and rearwardly to clear an obstruction during forward movement. Inasmuch as the lever arm 165, pitman 162, and flywheel 160 are all mounted on the rockshaft 35, they swing as a unit with the cutter bar about the axis of the rockshaft, while the universal joints 147, 150 and telescoping shaft 149 maintain the power connection.

It is desirable, however, to interrupt the flow of power to the sickle when the cutter bar swings rearwardly, and this is accomplished by means of a suitable clutch (not shown) within the gear housing 145. This invention is not particularly concerned with the details of the clutch mechanism, except that the latter is actuated by a control lever 175 pivotally mounted on a pin 176 on the gear housing 145 and is connected to a clutch actuating rod 177 which extends into the housing. A control rod 178 is connected to the upper end of the lever 175 and extends rearwardly to a position convenient to the tractor operator. The clutch is engaged by swinging the lever 175 rearwardly, or in a clockwise direction as viewed in Figure 7, and is disengaged by swinging the lever 175 in a counterclockwise direction.

The clutch lever 175 is automatically actuated to interrupt the flow of power to the sickle when the cutter bar swings rearwardly about the axis of the rockshaft 35, by means of a lever arm 180 fixed to the rockshaft 35 and having a slot 181 extending radially thereof. A strap member 182 is connected to the lever arm 180 by a bolt 183, which is slidable within the slot 181, but which is normally retained at the outer end of the slot by a spring 184. The strap 182 is attached to a flexible cable 185, which is slidable within a flexible incompressible tubing 186, the latter being anchored at its forward end by means of a clamp 187 to a bracket 188, fixed to the adjacent push bar 22. The rear end of the conduit 186 is anchored to a bracket 189 on top of the gear housing 145, while the rear end of the cable 185 is fixed to a clevis 190, which is connected with the lever 175. Since the lever arm 180 is substantially vertical when the cutter bar is in normal operating position, the initial movement of the cutter bar in its rearward direction, upon encountering an obstacle in the course of operation, pulls the cable 185 forwardly through the conduit 186, and swings the control lever 175 forwardly to disconnect the clutch mechanism within the housing 145. After the lever 175 has been swung through its arc of movement in disengaging the clutch, further angular movement of the arm 180 merely causes the bolt 183 to slide radially inwardly along the slot 181, but when the cutter bar is returned to normal position, the spring 184 returns the bolt 183 outwardly to the outer end of the slot. By this means, the clutch mechanism is quickly disengaged by the swinging of the lever arm 180 through its first few degrees of movement upon release of the latch mechanism 45.

The rearward swinging movement of the cutter bar is facilitated by a counterbalancing spring 191, which is suitably connected to the cutter bar support 167 below the rockshaft 35 and is anchored to the bracket 188 on the push bar 22.

The cutter bar is secured in its retracted position for purposes of transport, by means of a latch 195 fixed to a collar 196, journaled on the transverse frame member 30. The latch 195 is adapted to engage the lug 90 on the heel of the mower shoe 38. The spring 197 urges the latch 195 toward latched position, which is determined by a stop bolt 198 extending through a slot in the collar 196 and fixed to the beam 30. Thus, when the cutter bar swings rearwardly, through its full range of movement, the latch automatically engages the lug 90. To disengage the latch 195, the operator pulls on a control rod 199, which is connected to an arm 200 on top of the latch collar 196, thereby swinging the latch 195 forwardly out of engagement with the lug 90.

At times it is desirable to set the counterbalancing spring 191 with enough tension to raise the cutter bar if the latch mechanism 45 is not engaged. In such case, it is necessary for the operator to swing the cutter bar back to its operating position, or at least to assist such swinging movement as the tractor is backed, thereby rolling the runners 80 backwards along the ground. Such control of the cutter bar from the tractor seat is provided by means of a lever arm 203 welded to the rockshaft 35, and connected to a control chain 204 which extends rearwardly to a position convenient to the tractor operator. Thus, he is able to return the cutter bar to operating position by pulling on the control rod 199, releasing the latch with one hand and pulling on the chain 204 with the other hand to swing the cutter bar downwardly.

It is evident from the foregoing description that the mower of our invention provides a means for cutting grass and weeds along the shoulder of a highway without requiring the tractor to run on the pavement where it can block traffic. Furthermore, it is evident that a side mounted mower of the type disclosed in the aforementioned Coultas application can be installed on the tractor mid-section in a position to cut the adjacent swath on the shoulder or bank, or a conventional mower extending laterally from the rear of the tractor can be used, but in such case it might be difficult for the operator to watch both cutter bars.

It is also evident that when the front mounted mower embodying our invention encounters a stone or stump or other obstruction, the latch mechanism will be readily released regardless of what portion of the cutter bar encounters the obstruction, for the lever arm is uniform for every point on the cutter bar. This permits the latch to be set to release at a lower value of force opposing the forward movement of the cutter bar, resulting in less damage to the latter.

We claim:

1. A mowing machine of the class described, comprising a mobile frame, a ground engageable cutter bar extending transversely of the direction of travel thereof, means for swingably suspending said cutter bar on said frame providing for rearward and upward swinging movement of the cutter bar about a transverse axis spaced appreciably above the cutter bar, and releasable latch means for securing said cutter bar in ground engaging position.

2. A mowing machine of the class described, comprising a wheel supported frame, a ground engageable cutter bar extending transversely across the front of said frame in the path of said wheels, means for swingably suspending said cutter bar on said frame providing for rearward swinging movement of the cutter bar about a transverse axis disposed above the latter, and releasable latch means for securing said cutter bar in ground engaging position, said latch means being yieldable to an excessive draft force against the cutter bar when the latter encounters an obstruction during operation.

3. A mowing machine of the class described, comprising a tractor, a cutter bar associated therewith and disposed transversely of the direction of travel thereof, a framework for swingably supporting said cutter bar on said tractor providing for rearward and upward movement of said cutter bar from normal operating position, and a latch for restraining said cutter bar from swinging, said latch being yieldable to an excessive draft force occasioned by the cutter bar encountering an obstruction.

4. A machine of the class described, comprising a tractor, a cutter bar disposed transversely across the forward end of said tractor in the path of travel thereof, a framework for swingably connecting said cutter bar to said tractor providing for rearward and upward movement of said cutter bar relative thereto from a normal operating position, releasable latch means for restraining said cutter bar from swinging, and means engageable with the ground and connected with said cutter bar, for causing said cutter bar to swing upwardly and rearwardly upon release of said latch means.

5. A machine of the class described, comprising a tractor, a mower frame mounted thereon and extending forwardly therefrom, a pair of supports pivotally connected to said frame and depending therefrom by means providing for swinging movement about a transverse axis, a cutter bar mounted at the lower ends of said arms, and releasable bracing means for normally holding said supports against swinging relative to said frame, but upon release, permitting said cutter bar to swing rearwardly and upwardly to clear an obstruction.

6. A machine of the class described, comprising a tractor, a pair of push bars attached thereto and extending forwardly along opposite sides thereof, respectively, a rockshaft disposed transversely across the front of the tractor and journaled on said bars, a pair of laterally spaced legs fixed to said rockshaft and depending therefrom, a cutter bar mounted on the lower ends of said legs, an arm fixed to said rockshaft, and latch means connecting said arm with said push bars to brace said rockshaft and legs against rocking movement, said latch means being releasable to permit said cutter bar to swing rearwardly and upwardly from normal operating position.

7. A machine of the class described, comprising a tractor, a pair of push bars attached thereto and extending forwardly along opposite sides thereof, respectively, a rockshaft disposed transversely across the front of the tractor and journaled on said bars, a pair of laterally spaced legs fixed to said rockshaft and depending therefrom, a cutter bar mounted on the lower ends of said legs, cutting mechanism operatively associated with said cutter bar, a rotatable drive member mounted on said rockshaft, flexible power transmitting means for driving said member from the tractor engine, and a driving connection extending downwardly adjacent one of said legs for connecting said cutting mechanism with said drive member.

8. A machine of the class described, comprising a tractor, a pair of push bars attached thereto and extending forwardly along opposite sides thereof, respectively, a rockshaft disposed transversely across the front of the tractor and journaled on said bars, a pair of laterally spaced legs fixed to said rockshaft and depending therefrom, a cutter bar mounted on the lower ends of said legs, reciprocative cutting mechanism associated with said cutter bar, a flywheel rotatably mounted on said rockshaft, a bell crank mounted on one of said supporting legs and connected with said cutting mechanism, a pitman connecting said flywheel and said bell crank, and means for driving said flywheel from said tractor engine.

9. A machine of the class described, comprising a tractor, a mower frame including a pair of push bars pivotally connected thereto at their rear ends and extending forwardly therefrom along opposite sides of the tractor, respectively, said bars being swingable vertically about a transverse axis, a pair of laterally spaced legs depending from the forward end of said mower frame, a transverse cutter bar mounted on the lower ends of said legs and extending across the forward end of said tractor, a lifting lever mounted on said tractor and connected to said frame to raise the latter about said transverse axis, and spring means connected between said tractor and said mower frame to counterbalance the latter.

10. A machine of the class described, comprising a tractor, a mower frame including a pair of push bars pivotally connected thereto at their rear ends and extending forwardly therefrom along opposite sides of the tractor, respectively, said bars being swingable vertically about a transverse axis, a transverse rockshaft journaled at the forward ends of said bars, a pair of laterally spaced legs fixed to said rockshaft and depending therefrom, a transverse cutter bar mounted on the lower ends of said legs and extending across the forward end of said tractor, yieldable latch means connected between said rockshaft and said frame for normally bracing said legs against swinging relative thereto, said latch means being adapted to yield to an excessive draft force occasioned by the cutter bar encountering an obstruction during forward movement, counterbalancing spring means connected between said rockshaft and said frame, tending to urge said cutter bar to swing upwardly and rearwardly, a lifting lever mounted on said tractor and connected with said frame to lift the latter to a transport position, and a counterbalancing spring connected between said frame and said tractor.

11. A mowing machine comprising a mobile frame, a transverse cutter bar, a support therefor movably connected with said frame by means providing for rearward yielding movement of said cutter bar relative to said mobile frame upon encountering an obstruction during forward travel, and a yieldable latch for normally retaining said cutter bar in operating position but yieldable to an excessive draft force upon said cutter bar, said cutter bar supporting means and said latch being so arranged that the force exerted upon said latch is substantially uniform regardless of which portion of said cutter bar encounters the obstruction.

12. A mowing machine comprising a mobile frame, a transverse cutter bar, a support therefor pivotally connected to said frame providing for rearward swinging movement of said cutter bar, and a latch between said cutter bar support and said frame adapted to normally retain said cutter bar in operating position but yieldable, when the cutter bar encounters an obstruction during forward movement, to prevent damage to said cutter bar, said pivot connection and latch being so arranged that the mechanical advantage between the obstruction and the latch is the same regardless of which portion of the cutter bar encounters the obstruction.

13. A machine of the class described, comprising a mobile frame, a transversely disposed rockshaft journaled thereon and spaced appreciably above the ground, and a cutter bar disposed beneath said rockshaft and supported thereon, said cutter bar being swingable rearwardly and upwardly with said rockshaft about the axis of the latter to an elevated position clear of the ground.

14. A machine of the class described, comprising a mobile frame, a transversely disposed rockshaft journaled thereon and spaced appreciably above the ground, a cutter bar disposed beneath said rockshaft and supported thereon, said cutter bar being swingable with said rockshaft about the axis of the latter, and yieldable latch means for securing said rockshaft to hold said cutter bar in mowing position, but releasable to permit said cutter bar to swing rearwardly and upwardly from said mowing position.

15. A machine of the class described, comprising a mobile frame, a transversely disposed rockshaft journaled thereon and spaced appreciably above the ground, a cutter bar disposed beneath said rockshaft and supported thereon, said cutter bar being swingable with said rockshaft about the axis of the latter, yieldable latch means for securing said rockshaft to hold said cutter bar in mowing position, but releasable to permit said cutter bar to swing rearwardly and upwardly from said mowing position, and means, engageable with the ground, when said cutter bar leaves its normal operating position, for causing said cutter bar to swing upwardly and rearwardly.

16. A machine of the class described, comprising a mobile frame, a transversely disposed rockshaft journaled thereon and spaced appreciably above the ground, a cutter bar disposed beneath said rockshaft and supported thereon, said cutter bar being swingable with said rockshaft about the axis of the latter, yieldable latch means for securing said rockshaft to hold said cutter bar in mowing position, but releasable to permit said cutter bar to swing rearwardly and upwardly from said mowing position, and means, engageable with the ground, when said cutter bar leaves its normal operating position, for causing said cutter bar to swing upwardly and rearwardly, said means comprising a pair of ground engaging runners curved upwardly in front of at least one end of said cutter bar, and adapted to roll on the ground.

17. A machine of the class described, comprising a mobile frame, a transversely disposed rockshaft journaled thereon and spaced appreciably above the ground, a pair of depending legs fixed to said rockshaft, a cutter bar mounted on the lower ends of said legs and swingable therewith about the axis of said rockshaft, latch means for holding said cutter bar in normal operating position beneath said rockshaft, said latch means being releasable when an excessive draft force is applied thereto, and ground engaging runners for raising said cutter bar upwardly and rearwardly after said latch means is raised.

18. A tractor mower comprising a pair of push bars disposed along opposite sides of the tractor, a transverse yoke member to which the rear ends of said bars are pivotally connected for vertical swinging movement, means for pivotally supporting the intermediate portion of said yoke member on the tractor providing for lateral tilting movement relative thereto, and cutting mechanism mounted on the forward ends of said push bars.

19. In a mowing machine comprising a tractor, a mower frame mounted thereon by means providing for rearward swinging movement of said frame, cutting mechanism on said frame, and a power shaft connected with said cutting mechanism, the combination of means including a disengageable clutch for connecting said shaft with the tractor engine and having a control lever, and means connecting said control lever with said mower frame, for disengaging said clutch responsive to rearward swinging movement of said frame.

20. In a mowing machine comprising a mobile frame, a transversely disposed cutter bar supported thereon, a sickle cooperative with said cutter bar and adapted to reciprocate relative thereto, a pitman connected with said sickle, a flywheel having a crank connected with said pitman for reciprocating said cutter bar, means mounting said flywheel on said frame providing for lateral shifting movement of said flywheel relative to said frame for adjusting the register of said sickle relative to said cutter bar, and flexible power transmitting means for driving said flywheel in any position of lateral adjustment within the range thereof.

21. In a tractor mounted implement, a pair of push bars disposed along opposite sides of the tractor, a transverse yoke member to which the rear ends of said bars are connected, and means for pivotally supporting the intermediate portion of said yoke member on said tractor providing for lateral tilting movement relative thereto comprising a supporting shaft member rigidly fixed to the yoke member and disposed substantially perpendicular thereto, and a pair of fore and aft spaced bearings mounted on said tractor and adapted to receive opposite ends of said shaft member, respectively.

22. A tractor mower comprising a pair of push bars disposed along opposite sides of the tractor, a transverse yoke member to which the rear ends of said bars are pivotally connected for vertical swinging movement, means for pivotally supporting the intermediate portion of said yoke member on the tractor providing for lateral tilting movement relative thereto, a cutter bar supported on the forward ends of said arms, a pair of upstanding arms rigidly fixed to said yoke member at opposite ends, respectively, and a pair of springs connected between said arms and to said push bars for counterbalancing the weight of said cutter bar.

23. A machine of the class described, comprising a tractor, a transversely disposed rockshaft journaled thereon and spaced appreciably above the ground, a pair of depending legs fixed to said rockshaft, cutting mechanism mounted on the lower ends of said legs and swingable therewith rearwardly and upwardly about the axis of said rockshaft, latch means for holding said cutting mechanism in normal operating position beneath said rockshaft, said latch means being releasable when an excessive draft force is applied thereto, a power shaft connected with said cutting mechanism for transmitting power thereto, a disengageable clutch for connecting said power shaft with said tractor engine and having a control lever, and means connecting said legs with said control lever for disengaging said clutch responsive to rearward and upward swinging movement of said legs and cutting mechanism.

24. A machine of the class described, comprising a tractor, a transversely disposed rockshaft journaled thereon and spaced appreciably above the ground, a pair of depending legs fixed to said rockshaft, a transverse cutter bar mounted on the lower ends of said legs, a reciprocative sickle cooperative with said cutter bar, a pitman connected with said sickle, a flywheel journaled at one end of said rockshaft and having a crank connected to said pitman, and flexible belt means connecting said flywheel with the tractor engine for driving said sickle.

25. A machine of the class described, comprising a tractor, a transversely disposed rockshaft journaled thereon and spaced appreciably above the ground, a pair of depending legs fixed to said rockshaft, a transverse cutter bar mounted on the lower ends of said legs, a reciprocative sickle cooperative with said cutter bar, a pitman connected with said sickle, a flywheel having a crank to which said pitman is connected, a journal bearing fixed to said rockshaft and rockable therewith, a shaft rotatable in said bearing about a fore and aft extending axis, said flywheel being mounted on said shaft, and flexible shaft means connecting said flywheel shaft with the tractor engine.

26. A tractor mower comprising a tractor having a pair of push bars along opposite sides thereof and connected thereto, a transverse rockshaft journaled at the forward ends of said arms and extending across the front of said tractor, a pair of laterally spaced arms fixed to said rockshaft and depending therefrom, a transverse cutter bar supported on the lower ends of said arms and swingable rearwardly and upwardly from a ground engaging operating position with said arms and rockshaft, a reciprocative sickle cooperative with said cutter bar, and means for driving said sickle comprising a flywheel journaled on one end of said rockshaft, pitman means connecting said flywheel and said sickle, a pulley rotatably mounted adjacent the rear end of one of said arms, a belt trained over said pulley and said flywheel for transmitting power to the latter, and means connecting said rear pulley with the tractor engine.

27. A tractor mower comprising a tractor having a pair of push bars along opposite sides thereof and connected thereo, a transverse rockshaft journaled at the forward ends of said arms and extending across the front of said tractor, a pair of laterally spaced arms fixed to said rockshaft and depending therefrom, a transverse cutter bar supported on the lower ends of said arms and swingable rearwardly and upwardly from a ground engaging operating position with said arms and rockshaft, a reciprocative sickle cooperative with said cutter bar, and means for driving said sickle comprising a power shaft extending forwardly from the tractor, a short flywheel shaft having flexible joint means coupling the same to said power shaft but permitting rocking movement of said flywheel shaft with said rockshaft, a bearing fixed to said rockshaft and substantially perpendicular thereto for supporting said flywheel shaft, a flywheel on the forward end of said flywheel shaft and having a crank thereon, a pitman connected to said crank and reciprocable in a transverse plane, and means connecting said pitman with said sickle.

28. A tractor mower comprising a tractor having a pair of push bars along opposite sides thereof and connected thereto, a transverse rockshaft journaled at the forward ends of said arms and extending across the front of said tractor, a pair of laterally spaced arms fixed to said rockshaft and depending therefrom, a transverse cutter bar supported on the lower ends of said arms and swingable rearwardly and upwardly from a ground engaging operating position with said arms and rockshaft, a reciprocative sickle cooperative with said cutter bar, and means for driving said sickle comprising a power shaft extending forwardly from the tractor, a short flywheel shaft having flexible joint means coupling the same to said power shaft but permitting rocking movement of said flywheel shaft with said rockshaft, ta bearing in which said flywheel shaft is journaled, means for mounting said bearing on said rockshaft substantially perpendicular thereto but shiftable laterally relative thereto to adjust the register of the sickle on the cutter bar, a flywheel on the forward end of said flywheel shaft and having a crank thereon, and a pitman connected to said crank, and means connecting said sickle and said pitman.

LOUIS A. PARADISE.
WILBUR J. COULTAS.